US012464286B2

(12) United States Patent
Immonen et al.

(10) Patent No.: US 12,464,286 B2

(45) Date of Patent: Nov. 4, 2025

(54) CONTROLLING REPRODUCTION OF SOUND AND VIBRATION

(71) Applicant: Flexound Audio Oy, Nummela (FI)

(72) Inventors: Tommi Immonen, Vantaa (FI); Jukka Linjama, Espoo (FI); Aki Kivivirta, Helsinki (FI); Vesa Välimäki, Espoo (FI)

(73) Assignee: Flexound Audio Oy, Nummela (FI)

( * ) Notice: Subject to any disclaimer, the term of this patent is extended or adjusted under 35 U.S.C. 154(b) by 129 days.

(21) Appl. No.: 18/570,038

(22) PCT Filed: Jun. 15, 2021

(86) PCT No.: PCT/EP2021/066079

§ 371 (c)(1),
(2) Date: Dec. 13, 2023

(87) PCT Pub. No.: WO2022/262950

PCT Pub. Date: Dec. 22, 2022

(65) Prior Publication Data

US 2024/0284103 A1 Aug. 22, 2024

(51) Int. Cl.
*H04R 3/14* (2006.01)

(52) U.S. Cl.
CPC ........... *H04R 3/14* (2013.01); *H04R 2400/03* (2013.01); *H04R 2430/01* (2013.01); *H04R 2430/03* (2013.01)

(58) Field of Classification Search
CPC .. H04R 2430/03; H04R 3/14; H04R 2430/01; H04R 2400/03; H04R 29/00; H04R 3/04; G06F 3/016
See application file for complete search history.

(56) References Cited

U.S. PATENT DOCUMENTS

2013/0318438 A1 11/2013 Afshar
2018/0255411 A1 9/2018 Lin
(Continued)

FOREIGN PATENT DOCUMENTS

EP 3244628 A1 * 11/2017 ............. H04R 1/028
WO 2012173669 A2 12/2012

OTHER PUBLICATIONS

International Search Report and Written Opinion in Application No. PCT/EP2021/066079, mailed Feb. 18, 2022, 16 pages.
(Continued)

*Primary Examiner* — Kile O Blair

(74) *Attorney, Agent, or Firm* — Meunier Carlin & Curfman LLC

(57) ABSTRACT

A signal processing assembly is provided, the signal processing assembly comprising: a signal processing portion for deriving an output signal based on an input signal; and a control portion for controlling derivation of the output signal in the signal processing portion for rendering by a sound and vibration reproduction apparatus. The control portion is arranged to separately control respective amplifications for derivation of the output signal in a first frequency band and in a second frequency band, where the first frequency band represents tactile frequencies and the second frequency band represents audible frequencies, the signal control portion arranged to at least one of the following: determine a first amplification for the first frequency band in dependence of a user-selected second amplification for the second frequency band determine the first amplification for the first frequency band in dependence of a signal content type represented by the input signal.

17 Claims, 3 Drawing Sheets

(56) References Cited

U.S. PATENT DOCUMENTS

| | | | |
|---|---|---|---|
| 2019/0378385 | A1 | 12/2019 | Biggs |
| 2021/0152931 | A1 | 5/2021 | Yokoyama et al. |

OTHER PUBLICATIONS

International Preliminary Report on Patentability in Application No. PCT/EP2021/066079, mailed Feb. 10, 2023, 18 pages.

* cited by examiner

CONTROLLING REPRODUCTION OF SOUND AND VIBRATION

CROSS-REFERENCES

This is a U.S. national stage application of international patent application number PCT/EP2021/0066079 filed on Jun. 15, 2021.

TECHNICAL FIELD

The example embodiments of the present invention relate to enhanced reproduction of sound and vibration.

BACKGROUND

Human auditory perception takes place primarily through the ears, but it is supported by the sense of touch especially at lower end of frequency spectrum. As an example, at frequencies below 50 Hz, sound pressure levels above 80 dB are typically required in order to make a sound perceivable by a human listener. At such sound pressure levels, human skin starts to vibrate at perceivable levels as well, resulting in the sense of touch, i.e. the tactile sense, that server to support hearing. At frequencies below 20 Hz (infrasonic frequencies), hearing or sensing of air pressure vibrations is solely based on tactile perception. In addition to very low frequencies below 20 Hz, the frequency range of tactile perception on skin typically extends up to approximately 500 Hz, while for sensitized people who may have sensory impairments with other senses it may extend even up to approximately 1000 Hz. Thus, the tactile sense supports human hearing in a considerable part of the perceivable audio frequency spectrum.

Consequently, audio reproduction that conveys audible frequencies together with the tactile frequencies provides a multisensory approach that enables an immersive listening experience. However, for a high-quality reproduction of sound and vibration it is necessary to carefully control the tactile part of the frequency spectrum, on one hand, such that it truly complements the audible frequencies in a manner that conveys additional information to the listener and, on the other hand, such that any discomfort due to extensive vibration is avoided.

SUMMARY

Therefore, it is an object of the present invention to provide a technique that facilitates enhanced control over reproduction of tactile frequencies for a human listener.

According to an example embodiment, a signal processing assembly is provided, the signal processing assembly comprising: a signal processing portion for deriving an output signal based on an input signal; and a control portion for controlling derivation of the output signal in the signal processing portion for rendering by a sound and vibration reproduction apparatus, wherein the control portion is arranged to separately control respective amplifications for derivation of the output signal in a first frequency band and in a second frequency band, where the first frequency band represents tactile frequencies and the second frequency band represents audible frequencies, the signal control portion arranged to at least one of the following: determine a first amplification for the first frequency band in dependence of a user-selected second amplification for the second frequency band determine the first amplification for the first frequency band in dependence of a signal content type represented by the input signal.

According to another example embodiment, a sound and vibration reproduction arrangement is provided, the arrangement comprising: a signal processing assembly according to the example embodiment described in the foregoing and the sound and vibration reproduction apparatus for producing sound and vibration in accordance with the output signal.

According to another example embodiment, a method for controlling operation of a signal processing entity for deriving an output signal based on an input signal is provided, the method comprising: separately controlling respective amplifications for derivation of the output signal in a first frequency band and in a second frequency band, where the first frequency band represents tactile frequencies and the second frequency band represents audible frequencies, said separate controlling comprising at least one of the following: determining a first amplification for the first frequency band in dependence of a user-selected second amplification for the second frequency band; determining the first amplification for the first frequency band in dependence of a signal content type represented by the input signal.

According to another example embodiment, a computer program is provided, the computer program comprising computer readable program code configured to cause performing at least a method according to an example embodiment described in the foregoing when said program code is executed on a computing apparatus.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
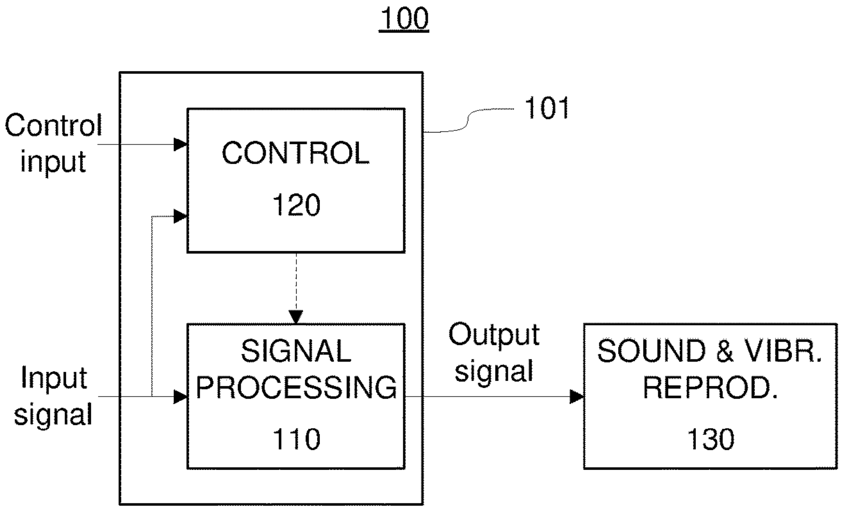
FIG. 1 illustrates a block diagram of some components of a sound and vibration reproduction arrangement according to an example.

FIG. 1 illustrates a block diagram of some (logical) components of a sound and vibration reproduction arrangement 100 according to an example. In the following, for brevity and clarity of the description, the sound and vibration reproduction arrangement 100 is simply referred to as a sound reproduction arrangement 100, while simultaneous reproduction of both sound and vibration is implied. The sound reproduction arrangement 100 according to the example of FIG. 1 includes a signal processing assembly 101 and a sound and vibration reproduction apparatus 130, where the signal processing assembly 101 comprises a signal processing portion 110 and a control portion 120. In this regard, the signal processing portion 110 may be arranged to derive an output signal based on an input signal under control of the control portion 120, whereas the control portion 120 may be arranged control the derivation of the output signal at least in part in dependence of a control input signal. In this regard, the control portion 120 may be arranged to generate one or more control signals at least in part in dependence of the input control signal, whereas the signal processing portion 110 may be arranged to derive the output signal in accordance with the one or more control signals.

Each of the input signal and the output signal represents the sound and vibration, whereas the signal processing portion 110 may derive the output signal based on the input signal in a manner that enhances reproduction of tactile frequencies by the sound and vibration reproduction apparatus 130. The output signal may be supplied to the sound and vibration reproduction apparatus 130, which may be arranged to generate simultaneous sound and vibration accordingly. Throughout the present disclosure, the input and output signals are predominantly referred to as input and output audio signals, respectively, even though a signal that represents both audio and vibration is implied. Along similar lines, a channel of the input and/or output signal may be referred to as a respective audio channel, even though a channel that represents both sound and vibration is implied.

The input audio signal may comprise a single-channel (monaural) audio signal or the input audio signal may comprise a multi-channel audio signal such as a two-channel audio signal that represents a stereo sound or an audio signal of two or more audio channels that represent sounds on respective channels of a surround sound according to predefined loudspeaker configuration (such as one of the 5.1 surround sound, 7.1 surround sound, 10.2 surround sound or 11.1 surround sound known in the art). In this regard, the signal processing portion 110 may be arranged to process each of the one or more audio channels of the input audio signal into a respective audio channel of the output audio signal. In the following examples, references to the operation of the signal processing portion 110 and the control portion 120 imply processing of a single audio channel, unless explicitly stated otherwise. However, these examples readily generalize into the signal processing portion 110 applying respective processing for a plurality of audio channels, where the processing may be substantially similar for each audio channel or where the processing may be different across audio channels.

In the following, for brevity and clarity of the description, the sound and vibration reproduction apparatus 130 is simply referred to as a sound reproduction apparatus 130, while simultaneous reproduction of both sound and vibration is implied. In an example, the sound reproduction apparatus 130 may comprise a sound and vibration reproduction assembly arranged inside a padding, where the sound and vibration reproduction assembly may comprise an actuator arranged to vibrate a board (or another substantially rigid structural element of the vibration assembly) in accordance with the output audio signal such that the vibration induced via the board is perceivable as vibration at an outer surface of the padding and as an audible sound radiated through the outer surface of the padding, thereby simultaneously reproducing the sound and vibration represented by the output audio signal.

In another example, the sound reproduction apparatus 130 may comprise a sound reproduction assembly and a vibration reproduction assembly provided separately from each other such that they are arranged to simultaneously reproduce the sound and vibration represented by the output audio signal, respectively. In such a setting, the sound reproduction assembly may comprise a loudspeaker arranged to output sounds that represent audible frequencies of the output audio signal such that they are radiated through the outer surface of the padding and the vibration reproduction assembly may comprise an actuator arranged to vibrate a board (or another substantially rigid structural element of the vibration assembly) in accordance with tactile frequencies represented by the output audio signal such that that the vibration induced via the board is perceivable as vibration at an outer surface of the padding.

Although the present disclosure predominantly refers to the sound and vibration reproduction assembly in singular, in general the sound reproduction apparatus 130 may comprise one or more sound and vibration reproduction assemblies of the kind described above in order to reproduce sound and vibration represented by a corresponding audio channel of the output audio signal. As an example, the sound reproduction apparatus 130 may comprise a respective sound and vibration reproduction assembly for one or more (e.g. each) audio channel of the output audio signal. Consequently, as examples in this regard, the sound reproduction apparatus 130 may comprise a single sound and vibration reproduction assembly arranged for reproduction of a monaural sound and vibration, it may comprise two sound and vibration reproduction assemblies arranged for reproduction of stereophonic sound and vibration in accordance with a stereophonic output audio signal, or it may comprise two or more sound and vibration reproduction assemblies for reproduction of a surround sound and vibration.

In a further example, the sound reproduction apparatus 130 may comprise at least one sound reproduction assembly that is capable of reproduction of vibration and one or more sound reproduction assemblies that are capable of reproducing audible sound. As an example of such an arrangement, the sound reproduction apparatus may comprise a single sound reproduction assembly for reproducing vibration and two or more sound reproduction assemblies for reproducing audible sound, where the single sound reproduction assembly that is capable of producing vibration may be applied for reproducing vibration represented by all audio channels of the output audio signal while the two or more sound reproduction assemblies that are capable of reproducing audible sound are applied for reproducing sound represented by the respective audio channels. In an example, the single sound reproduction assembly that is capable of producing vibration may be also capable of reproducing audible sound.

As non-limiting examples of such sound reproduction apparatuses, the padding of the sound reproduction apparatus 130 that encloses the one or more sound and vibration reproduction assemblies may comprise cushioning of a chair or a seat, such as an armchair for home or office use, a movie theatre seat, a seat of a vehicle such as a car seat, an airline seat, a seat of a bus or train, etc. If arranged, for example, in a cushioning of a seat, the one or more sound and vibration reproduction assemblies may be arranged, for example, in a backrest of the seat and/or in a headrest of the seat such that they are located in close proximity of the head of a person sitting in the seat. Hence, a non-limiting example that pertains to making use of the sound reproduction arrangement 100 comprises a vehicle including one or more seats, where one or more sound and vibration reproduction assemblies of the sound reproduction apparatus 130 are arranged within cushioning of a seat and where the signal processing assembly 101 may be arranged in a structure of the seat or elsewhere in the vehicle such that a communicative coupling between the two is provided to allow for transfer of the audio output signal from the signal processing assembly 101 to the sound reproduction apparatus 130.

Figure 2:
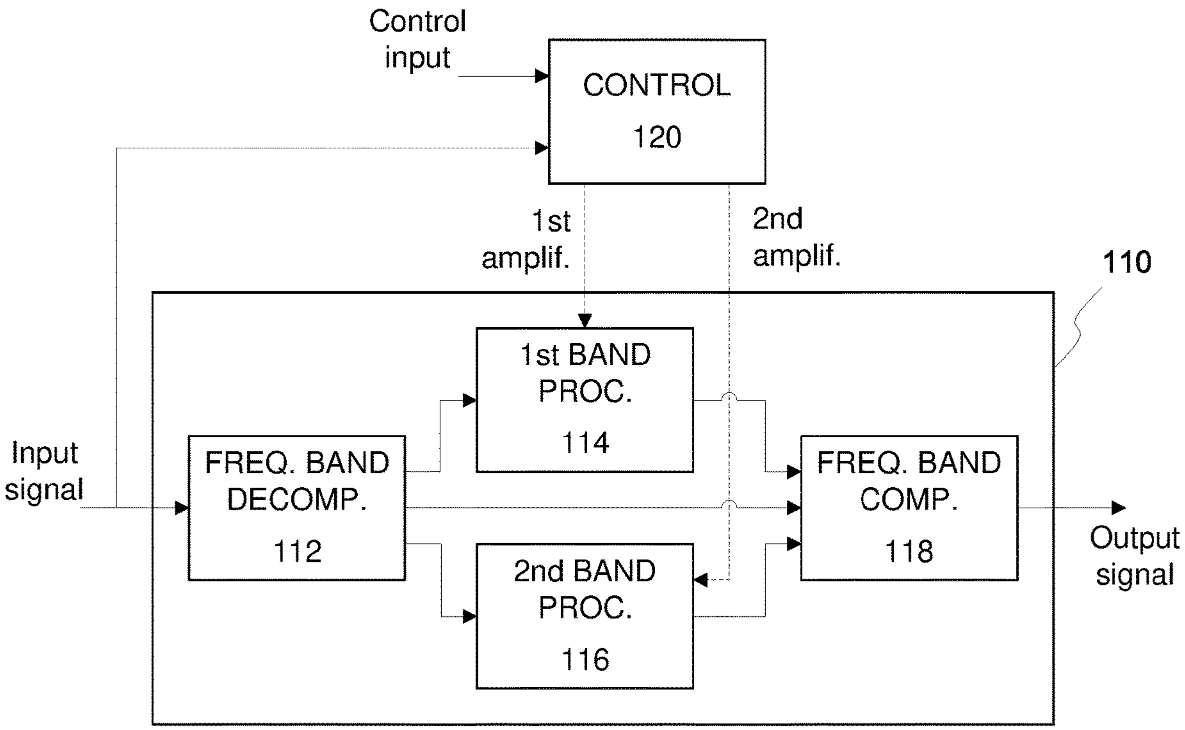
FIG. 2 illustrates a block diagram of some components of a signal processing portion and a control portion.

The control portion 120 may be arranged to separately control respective amplifications for derivation of the output audio signal in a first frequency band and a second frequency band, whereas the signal processing portion 110 may be arranged to derive the first and second frequency bands of the output audio signal by amplifying, respectively, the first and second frequency bands of the input audio signal according to the respective amplification determined therefor by the control portion 120. Herein, the term amplification is to be construed broadly, encompassing both amplification by an amplification factor that is larger than unity (i.e. actual amplification) and/or amplification by an amplification factor that is smaller than unity (i.e. attenuation). As an example of such processing by the signal processing assembly 101, FIG. 2 illustrates a block diagram of some (logical) components of the signal processing portion 110 and the control portion 120. The signal processing portion 110 according to the example of FIG. 2 comprises a frequency band decomposition portion 112, a first frequency band processing portion 114, a second frequency band processing portion 116 and a frequency band composition portion 118.

The frequency band decomposition portion 112 may be arranged decompose the input audio signal into (at least) two sub-band audio signals that each represent a respective one of at least two frequency bands. In this regard, the decomposition may result in at least a first sub-band audio signal that represents the first frequency band of the input audio signal and a second sub-band audio signal that represents the second frequency band of the input audio signal. Moreover, the first sub-band audio signal and the second sub-band audio signal may be provided, respectively, to the first frequency band processing portion 114 and the second frequency band processing portion 116 for respective amplification therein. In this regard, the first frequency band processing portion 114 may be arranged to apply a first amplification to the first sub-band audio signal to derive an amplified first sub-and audio signal that represents the first frequency band of the output audio signal, whereas the second frequency band processing portion 116 may be arranged to apply a second amplification to the second sub-band audio signal to derive an amplified second sub-and audio signal that represents the second frequency band of the output audio signal. The frequency band composition portion 118 may be arranged to (re) compose the output audio signal based at least on the amplified first and second sub-band signals.

In the example of FIG. 2, the frequency band decomposition portion 112 may comprise, for example, a suitable analysis filter bank, whereas the frequency band composition portion 118 may comprise, for example, a corresponding synthesis filter bank. The first and second frequency bands may be non-overlapping or they may be partially overlapping and the second frequency band comprises frequencies that are higher than those of the first frequency band. In case of overlapping first and second frequency bands a predefined sub-range of frequencies may be included in both the first and second frequency bands or the second frequency band may include the first frequency band in its entirety. In case of non-overlapping first and second frequency bands, the first and second frequency bands may be adjacent in frequency or the first and second frequency bands may be separated by a range of frequencies. Along the lines described in the forgoing, the output of the frequency band decomposition portion 112 includes at least the first and second frequency bands, whereas the output of the frequency band decomposition portion 112 may comprise one or more further frequency bands (e.g. covering the range of frequencies between the first and second frequency bands. Any such further frequency bands possibly resulting from the decomposition may be passed as such to the frequency band composition portion 118 for composition of the output audio signal.

As an example, the first frequency band may represent frequencies that are reproduced as vibration via operation of the sound reproduction apparatus 130 and the second frequency band may represent frequencies that are reproduced as audible sound via operation of the sound reproduction apparatus 130. In another point of view, the second frequency band may represent a plurality of aspects of the input audio signal that may be reproduced as an audible sound via the sound reproduction apparatus130, whereas the first frequency band may represent a plurality of aspects of the input audio signal that may be reproduced as vibration via the sound reproduction apparatus 130. Consequently, the first frequency band may be referred to as tactile frequency band or a vibration frequency band, whereas the second frequency band may be referred to as an audible frequency band or as a sound frequency band. As a non-limiting example, the tactile frequency band may cover frequencies approximately from 5 Hz to approximately 500 Hz and the audible frequency band may cover frequencies from approximately 50 Hz to approximately 20 kHz. As pointed out, the respective endpoints of the tactile and audible frequency bands mentioned above serve as non-limiting examples in this regard and in other examples the lower endpoint of the tactile frequency band may be a predefined value chosen from a range from 0 Hz to 50 Hz and the higher endpoint of the tactile frequency band may be a predefined value chosen from a range from 200 Hz to 1 KHz. Along similar lines, in other examples the lower endpoint of the audible frequency band may be a predefined value chosen from a range from 20 Hz to 100 Hz and the higher endpoint of the audible frequency band may be a predefined value chosen from a range from 16 kHz to 24 kHz.

Still referring to the example of FIG. 2, the control portion 120 may be arranged to derive the first amplification for the first frequency band and the second amplification for the second frequency band in accordance with the input control signal. As an example in this regard, the input control signal may comprise indication of a user-selected sound volume, whereas the control portion 120 may be arranged to convert the user-selected sound volume into a respective amplification value, which may be referred to as a user-selected amplification or as a user-selected selected amplification value. The user-selected amplification value may be applied as the second amplification in derivation of the second frequency band of the output audio signal in the second frequency band processing portion 116. Further in this regard, the control portion 120 may be arranged to derive the first amplification in dependence of the user-selected second amplification, thereby providing improved user experience via automated derivation of the first amplification. The first amplification may be applied in derivation of the first frequency band of the output audio signal in the first frequency band processing portion 114. As an example in this regard, the first amplification may be defined via a first gain to be applied to the first sub-band audio signal in the first frequency band processing portion 114 to scale (e.g. to multiply) the first sub-band audio signal and/or the second amplification may be defined via a second gain to be applied to the second sub-band audio signal in the second frequency band processing portion 116 to scale (e.g. to multiply) the second sub-band audio signal.

The aspect of the control portion 120 determining the first amplification in dependence of the second amplification may comprise usage of a predefined mapping function that defines an amplification applicable for the first frequency band as a function of the amplification applied for the second frequency band in view of a reference masking spectrum. As an example in this regard, the mapping function may directly define the relationship between the second amplification and the first amplification, e.g. as a mapping from a second amplification value (e.g. the second gain) that represents the user-selected second amplification to be applied on the second frequency band to a first amplification value (e.g. the first gain) that represents the first amplification to be applied on the first frequency band.

Figure 3:
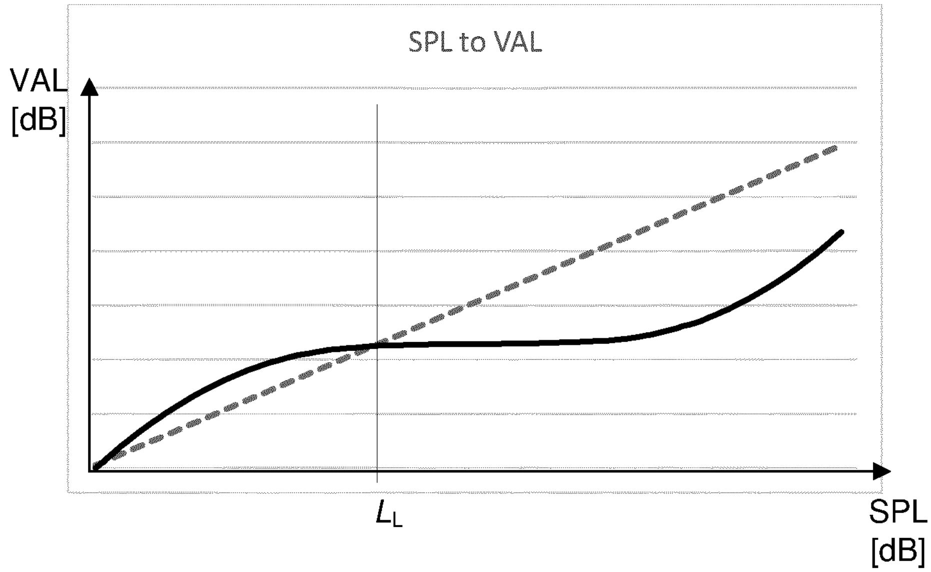
FIG. 3 illustrates a generic mapping function according to an example.

The mapping function may be tailored in accordance with a reference masking spectrum and the mapping function may aim at derivation of the first amplification in view of the reference masking spectrum such that perceivable vibration is provided also with relatively low sound pressure levels resulting from a relatively low user-selected second amplification for the second frequency band while avoiding production of extensive vibration that may cause user discomfort with relatively high sound pressure levels resulting from a relatively high user-selected second amplification for the second frequency band. In such a scenario, the mapping function may comprise or it may be based on a predefined curve that maps a range of sound pressure levels (SPLs) for the second frequency band to a corresponding range of SPLs for the first frequency band. In this regard, a SPL for the first frequency band may be referred to as a respective vibration acceleration level (VAL) to emphasize the aspect of the first frequency band representing tactile frequencies that are reproduced by the sound reproduction apparatus 130 as vibration. The mapping function may be based on user preferences and/or on the reference masking spectrum, as described in further detail via examples provided in the following. FIG. 3 illustrates a non-liming conceptual example of such a mapping function, where the solid curve indicates the mapping from SPL values to corresponding VAL values according to the mapping function and the dashed line serves as a reference that corresponds to a direct mapping from a SPL value to a corresponding VAL (such that a VAL equals the corresponding SPL).

The SPL and VAL are respective measures of sound and vibration reproduced via operation of the sound reproduction apparatus 130 based on the output audio signal and hence they do not only depend on characteristics of the output audio signal but also depend on characteristics of the sound reproduction apparatus 130. In terms of operation of the signal processing assembly 101, respective signal levels in the second frequency band and in the first frequency band may be considered as measures that correspond to the SPL and VAL, respectively. In this regard, the signal level in the second frequency band may be referred to as a second signal level and the signal level in the first frequency band may be referred to as a first signal level. Herein, each of the first signal level and second signal level may comprise a signal power (e.g. a peak power or a rms power) in the respective frequency band and/or a signal amplitude (e.g. a maximum amplitude or an average amplitude) in the respective frequency band over a predefined time window. In an example, the first and second signal levels (of the output audio signal) may directly represent the SPL and VAL, respectively. In another example, the reference masking spectrum may include a component (e.g. a reference sound reproduction spectrum, which is described in further detail in the following) that accounts for sound and vibration reproduction characteristics of the sound reproduction apparatus 130 to extent they may have an effect on respective relationships between the second signal level and the SPL and/or between the first signal level and the VAL.

The reference masking spectrum may represent predefined reference spectral characteristics of a target operating environment of the sound reproduction arrangement 100, e.g. a predefined reference background noise spectrum in the target operating environment. In this regard, the reference background noise spectrum may represent a shape of a background noise spectrum measured in the target operating environment or that otherwise reflects typical background noise characteristics in the target operating environment. While in relatively quiet operating environments such as home, office, a movie theatre, etc. the reference background noise spectrum may be relatively flat and hence may have only a minor or even negligible effect on the mapping function, in relatively noisy operating environments, such as an interior of vehicle such as a car or a bus or a passenger cabin of an aircraft, the reference background noise spectrum may have a strong emphasis on certain sub-ranges of the frequency spectrum, typically on low frequencies that coincide with the first frequency band. Even though in such noisy environments the absolute magnitude of the background noise spectrum varies with the noise level, on the other hand the spectral envelope of the background noise spectrum may be assumed to retain a substantially similar shape regardless of the noise level and, consequently, the reference background noise spectrum may serve to model the relative magnitude, i.e. a shape of the spectral envelope, of the background noise typically occurring in the target operating environment of the sound reproduction arrangement 100.

The reference masking spectrum may, additionally or alternatively, represent a predefined reference sound reproduction spectrum that may serve to model one or more aspects of sound and vibration reproduction characteristics of the sound reproduction apparatus 130. In this regard, a frequency response of a sound and vibration reproduction assembly of the sound reproduction apparatus 130 (in the first frequency band) may have a significant effect on the perceivable vibration originating therefrom and hence the reference sound reproduction spectrum may account for a frequency response of the respective sound and vibration reproduction assembly. Moreover, a transmission path of the sound and vibration from the sound and vibration reproduction assembly to the body and ears of user positioned in an assumed listening position may likewise have an effect on a user perception, especially with respect to the vibration. This aspect may be accounted for in the reference sound reproduction spectrum. As an example in this regard, the vibration originating from the sound and vibration reproduction assembly may be attenuated in the transmission path in a frequency dependent manner that depends on e.g. characteristics and thickness of the padding covering the sound and vibration reproduction assembly. As another example, different parts of a human body (e.g. head, neck, back, arms, etc.) typically have a different sensitivity for tactile perception and hence the position of the sound and vibration reproduction assembly in terms of the part of a user's body to which the resulting vibration is to be conveyed may be accounted for in the reference sound reproduction spectrum. Since the reference sound reproduction spectrum serves to model aspects that may be specific to a certain sound and vibration reproduction assembly intended for reproduction of a certain audio channel of the output audio signal, there may be a dedicated respective sound reproduction spectrum for each of the sound and vibration reproduction assemblies of the sound reproduction apparatus 130 and hence for each audio channel of the output audio signal.

Therefore, the derivation/calibration and/or usage of the mapping function may apply the reference masking spectrum in derivation of the first amplification such that a strength of the first amplification may follow the relative magnitude of the reference masking spectrum at the first frequency band: in case of a substantially flat reference masking spectrum the first amplification (e.g. the first gain) may be substantially independent of frequency and the first amplification value derived from the second amplification value via usage of the mapping function may be applied as the first amplification over the first frequency band. In case of a substantially non-flat reference masking spectrum the first amplification (e.g. the first gain) may be defined as a function of frequency (across the first frequency band) based on the first amplification value derived from the second amplification value via usage of the mapping function and the reference masking spectrum such that the first amplification at a certain frequency follows the relative magnitude of the reference masking spectrum at the respective frequency, e.g. in accordance with an amplification curve derivable as a product of the first amplification value obtained via usage of the mapping function and the reference masking spectrum. In contrast, the second amplification may be independent of frequency and hence the same second amplification (e.g. the same second gain) may be applied across the second frequency band regardless of the reference masking spectrum on the second frequency band. Along the lines described in the foregoing, the second amplification may comprise the amplification value converted from the user-selected sound volume.

Consequently, the mapping function typically provides a mapping that is non-linear in one or more of the following aspects:

- the mapping from the second amplification value to the first amplification value may be non-linear in that a difference in respective magnitudes of the second and first amplifications and/or in that a ratio between the second and first amplifications is different at different values of the second amplification;
- the first amplification obtained via the usage of the mapping function may comprise the amplification curve that defines a relative magnitude of the first amplification as a function of frequency (across the first frequency band), thereby rendering the mapping non-linear in terms of mapping the second amplification that may be substantially constant over the second frequency band to the first amplification that varies as a function of frequency over the first frequency band;
- the amplification curve that defines the relative magnitude of the first amplification as a function of frequency (across the first frequency band) is typically a non-linear curve that represents the underlying masking characteristics occurring in the target operating environment of the underlying sound reproduction arrangement 100 and/or the sound and vibration reproduction characteristics of the sound reproduction apparatus 130.

Derivation and/or calibration of the mapping function may proceed from an assumption that a preferred second amplification for the second frequency band at a certain masking level according to the reference masking spectrum (i.e. one representing the masking occurring due the background noise conditions and/or due to sound reproduction characteristics of the sound reproduction apparatus 130) may be one that results in a second signal level that corresponds to an SPL that is considered sufficient to overcome the reference masking spectrum in the second frequency band (e.g. one found sufficient by a user or one that exceeds the reference masking spectrum in the first frequency band by a respective predefined margin), whereas the corresponding first amplification may be one that results in a first signal level that corresponds to a VAL that is considered sufficient to overcome the reference masking spectrum in the first frequency band (e.g. one found sufficient by a user or one that exceeds the reference masking spectrum in the first frequency band by a respective predefined margin), thereby resulting in a balanced sensory experience between the audible perception and tactile perception. In this regard, the mapping function described herein may be considered as a generic mapping function that is applicable for output audio signals regardless of a type of signal content (e.g. a type of audio content) they represent, while the respective predefined margins that may be considered in derivation and/or calibration of the mapping function may be considered as respective generic margins.

According to an example, the mapping function may be derived via operating the signal processing assembly 101 and/or the sound reproduction arrangement 100 at a plurality of different masking levels in background noise conditions that correspond to the reference masking spectrum without setting the first amplification, and carrying out the following for each masking level:

- determine a second amplification value that results in a (user-) preferred SPL in the second frequency band at the respective masking level;
- determine a corresponding first amplification value that results in a (user-) preferred VAL in the first frequency band at the respective masking level; and
- record the determined pair of the second amplification value and the corresponding first amplification value for subsequent derivation of the mapping function.

Consequently, the mapping function that defines the first amplification value as a function of the second amplification value may be derived based on the second and first amplification values recorded for the plurality of masking levels in listening conditions that correspond to presence of a masking noise according to the reference masking spectrum. The mapping function may be provided, for example, as a mapping table that defines the correspondence between the second and first amplification values across a range of masking levels.

As an example, the mapping function described above may be derived via finding or otherwise defining a mapping that reflects preferences of a single user, thereby resulting in a personal mapping function that may be tailored for the respective user, whereas in another example the mapping function may be derived via finding or otherwise defining a mapping that reflects respective preferences of a plurality of users, thereby resulting in a general mapping function that may represent settings that are applicable for any user. In an example, the signal processing assembly 101 may have a plurality of (e.g. two or more) different mapping functions derived for a single user or a plurality of users, where the different mapping functions may reflect different perception preferences (e.g. four sound contents of different characteristics and/or for different moods of the user) and where the user may select the mapping function to be applied e.g. via the control input signal. In an example, the same mapping function may be applicable across the audio channels of the input and output audio signals, whereas in another example a dedicated (different) mapping function may derived and applied for one or more of the audio channels of the output audio signal (in order to account for possibly different reproduction spectra between of the sound and vibration reproduction assemblies intended for reproduction of respective channels of the output audio signal).

Hence, since the vibration arises from the output audio signal in the first frequency band (e.g. the tactile frequency band), the mapping function serves to ensure vibration intensity that is balanced with the perceivable loudness of sound in the second frequency band (e.g. the audible frequency band) such that the vibration is perceivable despite background noise present in the listening environment while avoiding extensive vibration that could be perceived as uncomfortable or even disturbing, thereby resulting in listening scenarios where the tactile perception truly enhances the overall listening experience.

The mapping function typically results in setting the first amplification to be different from the second (user-selected) amplification for a plurality of different second amplifications. As non-limiting examples in this regard, the mapping provided via operation of the mapping function may result in providing at least one of the following:

- the first amplification may be larger than the second amplification for second amplifications that are smaller than a predefined threshold,
- the first amplification may be smaller than the second amplification for second amplifications that are larger than the predefined threshold.

The above characteristic of the mapping function are observable also in the example of FIG. 3, where second amplification values that are smaller than LL map to first amplification values that are larger than a corresponding second amplification value and where second amplification values that are larger than LL map to first amplification values that are smaller than a corresponding second amplification value. In other words, for relatively low second amplifications (that correspond to relatively low user-selected sound volumes) the first amplification may be higher than the second amplification to ensure perceivable vibration in the tactile frequency band, whereas for relatively high second amplifications (that correspond to relatively high user-selected sound volumes) the first amplification may be lower than the second amplification to ensure avoiding extensive vibration that may cause discomfort to a user.

In the examples described in the foregoing, the control portion 120 may be arranged to derive the first amplification in dependence of the user-selected second amplification via usage of the predefined mapping function designed for the purpose. In another example, the control portion 120 may define the first amplification in dependence of signal content conveyed by the input audio signal. Hence, such a signal-content-based derivation of the first amplification may be carried out instead of the mapping-function-based derivation of the first amplification. In this regard, the input audio signal may be classified to represent one of a plurality of signal content types, whereas derivation of the first amplification may at least partially rely on this classification. As a non-limiting example, the plurality of signal content types may comprise a plurality of signal content types.

The aspect of the control portion 120 determining the first amplification in dependence of the signal content of the input audio signal may comprise, for example, the control portion 120 carrying out the following:

- determine the signal content type of the input audio signal to be one of a plurality of (e.g. two or more) predefined signal content types that each have a respective amplification profile assigned thereto, and
- determine the first amplification based on the user-selected second amplification in accordance with the amplification profile assigned to the determined one of the plurality of predefined signal content types.

Any amplification profile may define one or more rules for computing the first amplification based on the second amplification in order to provide the vibration at a level that is considered suitable for the respective signal content type in consideration of the second amplification selected for the second frequency band. As an example in this regard, an amplification profile assigned to a certain signal content type may define a respective adjustment curve to be applied to the second amplification for derivation of the first amplification. In this regard, the adjustment curve may define an adjustment factor as a function of frequency (across the first frequency band) for the respective signal content type, where an amplification curve that defines the first amplification as a function of frequency (across the first frequency band) may be derived as a product of the second amplification and the adjustment curve. Hence, unlike in the mapping-function-based example described above, the user-selected second amplification value is not mapped into a second-amplification-specific first amplification value but all values of the second amplification may result in similar application of the adjustment curve defined in the amplification profile assigned to the respective signal content type.

The amplification profile assigned to a certain signal content type may further define a predefined maximum energy and/or predefined minimum energy for the first frequency band for the respective signal content type. In this regard, the maximum energy may reflect a predefined maximum VAL considered suitable for the respective signal content type and the minimum energy may reflect a respective minimum VAL considered suitable for the respective signal content type. Herein, the maximum energy may be defined as a single value that is applicable throughout the first frequency band in its entirety or as a maximum energy curve that defines the maximum energy as a function of frequency across the first frequency band. Along similar lines, the minimum energy may be defined as a single value that is applicable throughout the first frequency band in its entirety or as a minimum energy curve that defines the minimum energy as a function of frequency across the first frequency band. Consequently, the first amplification derivable as the product of the second amplification and the adjustment curve may be limited such that the resulting signal energy in the first frequency band complies with the maximum and/or minimum energies possible defined by the amplification profile. Hence, the maximum and/or minimum energies possibly defined for the amplification profile enable sufficient tactile perception at different user-selected sound volumes while avoiding extensive vibration that may be perceived as uncomfortable or even disturbing.

According to an example, the plurality of signal content types may include at least one of the following: speech, music, mixed audio, sound massage, sound and/or vibration effects, alarm sounds and/or vibrations. Hence, the signal content type may be considered as labeling that accounts for long-term characteristics of the input audio signal e.g. in terms of its signal level, variations in its signal level, temporal characteristics and/or spectral characteristics rather than defining any short-term or instantaneous characteristics of the input audio signal. Each of these signal content types may have a respective amplification profile that is different from respective amplification profiles assigned to the other signal content types, whereas the amplification curve (possibly together with the maximum and/or minimum energies) defined in the respective amplification profile may be tailored to provide vibration characteristics that are considered suitable for reproduction of an audio signal of the respective signal content type. As non-limiting examples in this regard, an amplification profile assigned for speech content may define vibration that is lower in intensity than that defined for an amplification profile assigned for music content, whereas an amplification profile assigned for music content may define vibration that is lower in intensity that that defined for an amplification profile assigned for sound massage content or sound effect content.

According to an example, the control portion 120 may acquire information of the signal content type of the input audio signal based on metadata associated with the input audio signal and received at the signal processing assembly 101 together with the input audio signal. As an example of a metadata based approach the metadata may include a direct indication of the signal content type the associated input audio signal represents and/or the metadata may include information that is applicable for deriving the signal content type. In another example, the control portion 120 may carry out an analysis of the input audio signal to determine the signal content type of the input audio signal.

In the examples described in the foregoing, the control portion 120 may be arranged to derive the first amplification in dependence of the user-selected second amplification via usage of the generic mapping function or in dependence of the signal content type of the input audio signal. In a further example, these two approaches may be applied together such that the control portion 120 may define the first amplification in dependence of the user-selected second amplification and further in dependence of the signal content type of the input audio signal.

As an example of such a combined approach, the control portion 120 may be arranged to select and apply one of a plurality of mapping functions, each mapping function assigned to a respective one of a plurality of signal content types. In such a combined approach the control portion 120 may carry out, for example, the following:

determine the signal content type of the input audio signal to be one of a plurality of (e.g. two or more) predefined signal content types that each have a respective mapping function that defines an amplification applicable to the first frequency band as a function of the amplification selected for the second frequency band, determine the first amplification based on the user-selected second amplification via usage of the mapping function assigned to the determined signal content type.

In this regard, a mapping function assigned to a certain signal content type may be different from respective mapping functions assigned to the other signal content types, the mapping function assigned to the certain signal content type thereby providing a mapping that is specific to and considered suitable for audio signals of the respective signal content type. The mapping function for a certain signal content type may be derived and/or calibrated according to the procedure described in the foregoing, mutatis mutandis. Along the lines described in the foregoing for the generic mapping function, also the mapping function that is specific to the certain signal content type may be partially based on the reference masking spectrum that represents the target operating environment of the sound reproduction arrangement 100. A difference to derivation of the generic mapping function is the manner of considering the first amplification that is considered sufficient in view of the masking level in the first frequency band: instead of considering the same amplification across all signal content types, a different mapping from a certain second amplification to a corresponding first amplification may be defined for the plurality of signal content types (e.g. via finding respective user preferences or via applying respective predefined margins considered suitable for the respective signal content types).

As non-limiting examples regarding different mapping functions for different signal content types, one or more of the following may apply:

- a mapping function for music content may define in a first amplification value that is larger than that defined by a mapping function for speech content for a plurality of (e.g. all) values of the second amplification values, thereby providing output audio signals representing music content with a higher vibration intensity in comparison to that provided for output audio signals that represent speech content;
- a mapping function for sound massage or sound and/or vibration effect content may define a first amplification value that is larger than that defined by a mapping function for music content, thereby providing output audio signals representing sound massage or sound and/or vibration effect content with a higher vibration intensity in comparison to that provided for output audio signals that represent music content.

Figure 4:
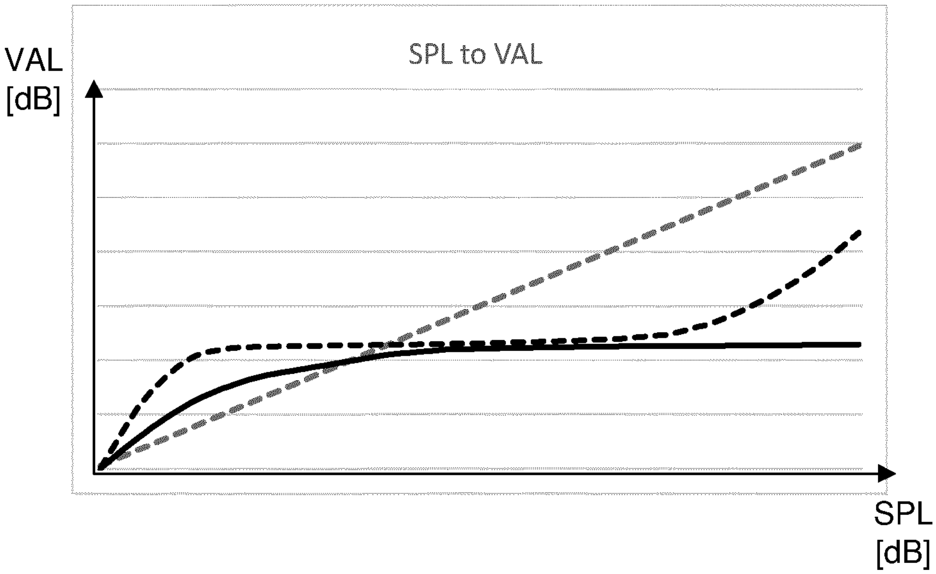
FIG. 4 illustrates signal content type specific mapping functions according to an example.

In this regard, FIG. 4 illustrates respective non-limiting conceptual examples of mapping functions applicable for speech content and for music content, where the black solid curve represents the mapping curve applicable for speech content and the black dashed curve represents the mapping curve for music content, whereas the grey dashed line serves as a reference that corresponds to a direct mapping from a SPL value to a corresponding VAL (such that a VAL equals the corresponding SPL).

The examples provided in the forgoing, at least implicitly, pertain to mapping a single audio channel of the input audio signal to a corresponding audio channel of the output audio signal. In further examples, any of the mapping-function-based derivation of the first amplification, the signal-content-based derivation of the first amplification, or an approach that is a combination of the two may be applied to derive a channel of the output audio signal based on two or more channels of the input audio signal. In such scenario, the mapping function or the amplification profile applicable for deriving the first amplification for the respective audio channel of the output audio signal may be designed to additionally account for the fact the first frequency band of the respective audio channel of the output audio signal represents vibration originating from the two or more audio channels of the input audio signal, especially in terms of keeping the VAL arising from the resulting vibration within a desired range.

The examples provided in the forgoing, at least implicitly, assume predefined mapping between audio channels of the input and output audio signals and the respective mapping function or amplification profile applicable therefor. In a further example, the control portion 120 may apply the metadata possibly received at the signal processing assembly 101 together with the input audio signal is control input for determining an applicable mapping function or amplification profile. An example in this regard, the metadata may define the channel configuration of (or an assume loudspeaker configuration for) the input audio signal, whereas the control portion 120 may apply this information on audio channels for selecting suitable predefined mapping functions to be applied for derivation of the respective audio channels of the output audio signal.

In a further example, the control portion 120 may be arranged to apply a predefined time correction function, which may be applicable for reducing the first amplification in response to a signal power in the first frequency band continuously exceeding a predefined signal power threshold for at least a predefined time period. Herein, the first amplification may be one derived via usage of a mapping function or an amplification profile of the type described in the foregoing. As an example in this regard, the time correction function may be arranged to reduce the first amplification according to a predefined attenuation curve as a response to the signal power in the first frequency band having continuously exceeded the predefined signal power threshold for at least the predefined time period. In this regard, the attenuation curve may be a monotonically non-increasing function that defines an attenuation factor (e.g. a scaling factor or scaling gain that is smaller than unity) to be applied to the first amplification as a function time. In an example, the curve may be substantially flat, thereby defining a substantially fixed attenuation factor, whereas in another example the curve may be at least partially monotonically decreasing one, thereby defining an attenuation factor that decreases over time.

In a further example, the control portion 120 may be arranged to complement the first frequency band of the output audio signal via introduction of signal components that are not present in the respective audio channel(s) of the input audio signal. As an example in this regard, the control portion 120 may introduce sub-harmonic components of signal components appearing in the second frequency band to first frequency band in order to complement or introduce tactile characteristics of the output audio signal. Also in such an approach the first amplification may be derived in accordance with any of the approached described in the forgoing. Such 'boosting' of the first frequency band may be especially suitable for certain signal content types, e.g. music, sound massage and/or sound effects.

While the description above describes various examples concerning aspects of processing the output audio signal based on the input audio signal and/or rendering the sound and vibration represented by the output audio signal with references to the signal processing assembly 101 and the sound reproduction apparatus 130, some aspects of operation of the signal processing assembly 101 and/or the sound reproduction apparatus 130 may be, alternatively, provided as steps of a method for controlling operation of the signal processing portion 110 in order to derive the output audio signal based on an input audio signal. In this regard, the method may comprise separately controlling respective amplifications for derivation of the output signal in a first frequency band and in a second frequency band, where the first frequency band represents tactile frequencies and the second frequency band represents audible frequencies, said controlling comprising at least one of the following, where said separate controlling comprising at least one of the following: determining a first amplification for the first frequency band in dependence of a user-selected second amplification for the second frequency band; and/or determining the first amplification for the first frequency band in dependence of a signal content type represented by the input signal. The method may be varied and/or complemented, for example, in accordance with the examples described in the foregoing with reference to operation and characteristics of the control portion 120 and/or the signal processing portion 110.

Figure 5:
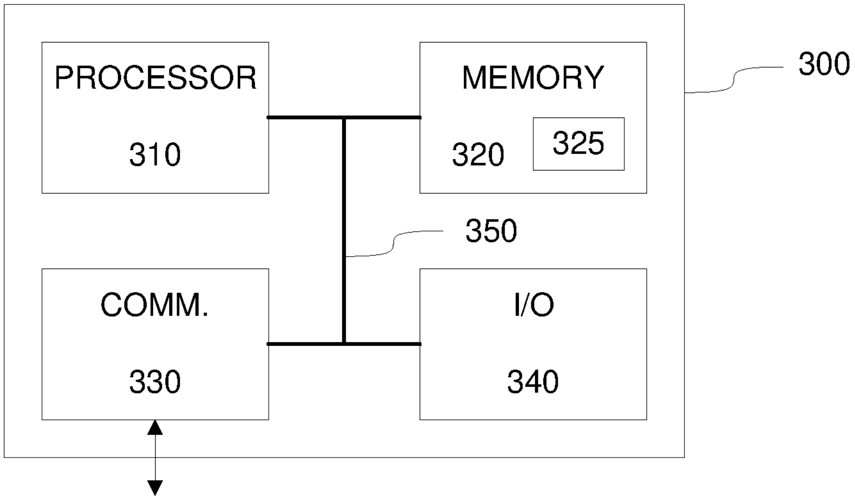
FIG. 5 illustrates a block diagram of some components of an apparatus according to an example.

FIG. 5 illustrates a block diagram of some components of an exemplifying apparatus 300. The apparatus 300 may comprise further components, elements or portions that are not depicted in FIG. 5. The apparatus 300 may be referred to as a computing apparatus and it may be employed e.g. in implementing at least some of the operations, procedures and/or functions described in the foregoing with references to the signal processing assembly 101.

The apparatus 300 comprises a processor 310 and a memory 320. The memory 320 may store data and computer program code 325. The apparatus 300 may further comprise communication portion 330 for wired or wireless communication with other apparatuses over a communication network and/or a communication link, where the communication portion 330 may enable receiving the input audio signal form another apparatus and/or for providing the output audio signal to another apparatus (e.g. one implementing the sound reproduction apparatus 130).

The apparatus 300 may further comprise user I/O (input/output) components 340 that may be arranged, together with the processor 310 and a portion of the computer program code 325, to provide a user interface for receiving input from a user and/or providing output to the user. In this regard, the input from a user may comprise, for example, the control input signal described above. In particular, the user I/O components 340 may include user input portion, such as one or more keys or buttons, a keyboard, a touchscreen or a touchpad, etc. The user I/O components may include output portion, such as a display or a touchscreen. The components of the apparatus 300 are communicatively coupled to each other via a bus 350 that enables transfer of data and control information between the components.

The memory 320 and a portion of the computer program code 325 stored in the memory 320 may be further arranged, with the processor 310, to cause the apparatus 300 to carry out at least some of the operations, procedures and/or functions described in the foregoing with references to the signal processing assembly 101. The processor 310 is configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement at least some of the operations, procedures and/or functions described in the foregoing with references to the signal processing assembly 101 when loaded into the processor 310. As an example, the computer program code 325 may include a computer program consisting of one or more sequences of one or more instructions. The processor 310 is able to load and execute the computer program by reading the one or more sequences of one or more instructions included in the computer program from the memory 320. The one or more sequences of one or more instructions may be configured to, when executed by the processor 310, cause the apparatus 300 to carry out at least some of the operations, procedures and/or functions described in the foregoing with references to the signal processing assembly 101. Hence, the apparatus 300 may comprise at least one processor 310 and at least one memory 320 including the computer program code 325 for one or more programs, the at least one memory 320 and the computer program code 325 configured to, with the at least one processor 310, cause the apparatus 300 to carry out at least some of the operations, procedures and/or functions described in the foregoing with references to the signal processing assembly 101.

The computer program code 325 may be provided e.g. a computer program product comprising at least one computer-readable non-transitory medium having the computer program code 325 stored thereon, which computer program code 325, when executed by the processor 310 causes the apparatus 300 to carry out at least some of the operations, procedures and/or functions described in the foregoing with references to the signal processing assembly 101. The computer-readable non-transitory medium may comprise a memory device or a record medium that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc.

The invention claimed is:

1. A sound and vibration reproduction arrangement comprising a signal processing assembly, a padding, and a sound and vibration reproduction apparatus comprising a sound and vibration reproduction assembly arranged inside the padding and comprising an actuator arranged to vibrate a board in accordance with an output signal such that vibration induced via the board is perceivable as vibration at an outer surface of the padding and as an audible sound radiated through the outer surface of the padding, wherein the signal processing assembly comprises:

a signal processing portion arranged to derive first and second frequency bands of the output signal via amplifying, respectively, the first and second frequency bands of an input signal; and a control portion for controlling derivation of the output signal in the signal processing portion for rendering by the sound and vibration reproduction apparatus, wherein the control portion is arranged to separately control respective amplifications for derivation of the output signal in the first frequency band and in the second frequency band, where the first frequency band represents tactile frequencies and the second frequency band represents audible frequencies, the control portion arranged to determine a first amplification for the first frequency band in dependence of a user-selected second amplification for the second frequency band via a predefined mapping function that is non-linear at least in one of the following ways: a difference in respective magnitudes of the second and first amplifications is different at different values of the second amplification, and/or a ratio between the second and first amplifications is different at different values of the second amplification, wherein the predefined mapping function defines an amplification applicable to the first frequency band as a function of the amplification selected for the second frequency band in view of a reference masking spectrum that represents a predefined sound reproduction spectrum that models a transmission path from the sound and vibration reproduction apparatus to body and ears of a user positioned in an assumed listening position.

2. The sound and vibration reproduction arrangement according to claim 1, wherein the first amplification is defined as a function of frequency across the first frequency band.

3. The sound and vibration reproduction arrangement according to claim 1, wherein the first amplification is different from the second amplification for a plurality of different second amplification values.

4. The sound and vibration reproduction arrangement according to claim 3, wherein the predefined mapping function is based on a mapping from a range of second amplification values that represent a respective range of second signal levels in the second frequency band to a corresponding range of first amplification values that represent a respective range of first amplitude levels in the first frequency band.

5. The sound and vibration reproduction arrangement according to claim 4, wherein the range of second amplification values and the corresponding range of first amplification values include a plurality of pairs of a second amplification value and a corresponding first amplification value associated with a respective masking level according to the reference masking spectrum, where in each pair the respective second amplification value represents a second signal level that is considered sufficient to overcome the reference masking spectrum in the second frequency band at the respective masking level and the respective corresponding first amplification value represents a first signal level that is considered sufficient to overcome the reference masking spectrum in the first frequency band at the respective masking level.

6. The sound and vibration reproduction arrangement according to claim 1, wherein the control portion is arranged to determine the first amplification in dependence of the second amplification and further in dependence of a signal content type represented by the input signal, the control portion arranged to determine the signal content type of the input signal as one of a plurality of predefined signal content types, each having a respective mapping function that defines an amplification applicable to the first frequency band as a function of the amplification selected for the second frequency band in view of a respective reference masking spectrum assigned thereto; and determine the first amplification via usage of the mapping function assigned to the determined signal content type.

7. The sound and vibration reproduction arrangement according to claim 6, wherein the predefined mapping function assigned to the determined signal content type is based on a mapping from a range of second amplification values that represent a respective range of second signal levels in the second frequency band to a corresponding range of first amplification values that represent a respective range of first signal levels in the first frequency band in view of the determined signal content type.

8. The sound and vibration reproduction arrangement according to claim 7, wherein the range of second amplification values and the corresponding range of first amplification values include a plurality of pairs of a second amplification value and a corresponding first amplification value associated with a respective masking level according to the reference masking spectrum, where in each pair the respective second amplification value represents a second signal level that is considered sufficient to overcome the reference masking spectrum in the second frequency band at the respective masking level and the respective corresponding first amplification value represents a first signal level that is considered sufficient to overcome the reference masking spectrum in the first frequency band at the respective masking level.

9. The sound and vibration reproduction arrangement according to claim 6, wherein the plurality of the predefined signal content types includes at least two of the following:
- speech,
- music,
- mixed audio,
- sound massage,
- sound and/or vibration effects,
- alarm sounds and/or vibrations.

10. The sound and vibration reproduction arrangement according to claim 6, wherein the control portion is arranged to determine the signal content type via one of the following:
- metadata associated with the input signal,
- analysis of the input signal.

11. A computer readable non-transitory medium comprising computer readable program code configured to cause performing at least the method according to claim 6 when said program code is executed on a control portion of a signal processing assembly of a sound and vibration reproduction arrangement comprising the signal processing assembly, a padding, and a sound and vibration reproduction apparatus comprising a sound and vibration reproduction assembly arranged inside the padding and comprising an actuator arranged to vibrate a board in accordance with an output signal such that vibration induced via the board is perceivable as vibration at an outer surface of the padding and as an audible sound radiated through the outer surface of the padding.

12. The sound and vibration reproduction arrangement according to claim 1, wherein the reference masking spectrum further represents one or more of the following:
- a predefined reference background noise spectrum that represents spectral characteristics of background noise conditions in a target operating environment of the sound and vibration reproduction apparatus;
- a predefined sound reproduction spectrum that models a frequency response of the sound and vibration reproduction apparatus.

13. The sound and vibration reproduction arrangement according to claim 1, wherein the control portion is arranged to reduce the first amplification in response to a signal power in the first frequency band continuously exceeding a predefined threshold for at least a predefined period of time.

14. The sound and vibration reproduction arrangement according to claim 1, wherein the sound and vibration reproduction apparatus comprises two or more sound and vibration reproduction assemblies disposed inside the padding to generate mechanical vibration that is perceivable as a vibration and sound on at least one outer surface of the padding and to radiate a sound through said at least one outer surface of the padding, where each sound and vibration reproduction assembly is arranged to reproduce sound and vibration that represents a respective audio channel of the output signal.

15. The arrangement comprising a seat and a sound and vibration reproduction arrangement according to claim 1, wherein said padding comprises cushioning of said seat.

16. The arrangement according to claim 15, wherein the seat comprises a movie theatre seat or a seat of a vehicle.

17. A method for controlling operation of a signal processing portion of a signal processing assembly of a sound and vibration reproduction arrangement comprising the signal processing assembly, a padding, and a sound and vibration reproduction apparatus comprising a sound and vibration reproduction assembly arranged inside the padding and comprising an actuator arranged to vibrate a board in accordance with an output signal such that vibration induced via the board is perceivable as vibration at an outer surface of the padding and as an audible sound radiated through the outer surface of the padding, wherein the signal processing portion is arranged to derive first and second frequency bands of an output signal via amplifying, respectively, the first and second frequency bands of an input signal, the method comprising:

separately controlling respective amplifications for derivation of the output signal in the first frequency band and in the second frequency band, where the first frequency band represents tactile frequencies and the second frequency band represents audible frequencies, said separate controlling comprising determining a first amplification for the first frequency band in dependence of a user-selected second amplification for the second frequency band via a predefined mapping function that is non-linear at least in one of the following ways: a difference in respective magnitudes of the second and first amplifications is different at different values of the second amplification, and/or a ratio between the second and first amplifications is different at different values of the second amplification, wherein the predefined mapping function defines an amplification applicable to the first frequency band as a function of the amplification selected for the second frequency band in view of a reference masking spectrum that represents a predefined sound reproduction spectrum that models a transmission path from the sound and vibration reproduction apparatus to body and ears of a user positioned in an assumed listening position.

* * * * *